US010151969B2

(12) United States Patent
Otsuki et al.

(10) Patent No.: US 10,151,969 B2
(45) Date of Patent: Dec. 11, 2018

(54) PROJECTOR HAVING REFLECTING MIRROR DISPOSED WITHIN HOUSING AND OPERATION BUTTONS DISPOSED ON SIDEWALL OF THE HOUSING

(75) Inventors: Nobuyuki Otsuki, Matsumoto (JP); Tetsu Nakayama, Matsumoto (JP); Genta Kawabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 628 days.

(21) Appl. No.: 12/814,659

(22) Filed: Jun. 14, 2010

(65) Prior Publication Data

US 2010/0321644 A1 Dec. 23, 2010

(30) Foreign Application Priority Data

Jun. 18, 2009 (JP) .................................. 2009-145053

(51) Int. Cl.
*G03B 21/28* (2006.01)
*G03B 21/14* (2006.01)
*H04N 9/31* (2006.01)

(52) U.S. Cl.
CPC ........... *G03B 21/147* (2013.01); *G03B 21/14* (2013.01); *G03B 21/28* (2013.01); *H04N 9/3141* (2013.01)

(58) Field of Classification Search
USPC ......... 353/98, 119, 37, 50, 73, 77; D16/230, D16/221, 225, 231, 234, 235
See application file for complete search history.

(56) References Cited

U.S. PATENT DOCUMENTS

| 7,901,092 | B2 | 3/2011 | Adachi et al. |
| 7,967,453 | B2 | 6/2011 | Adachi et al. |
| 8,096,663 | B2 | 1/2012 | Adachi et al. |
| 8,246,176 | B2 | 8/2012 | Adachi et al. |
| 8,414,133 | B2 | 4/2013 | Adachi et al. |
| 2007/0291236 | A1 | 12/2007 | Hirata et al. |

(Continued)

FOREIGN PATENT DOCUMENTS

| JP | 2002-082387 A | 3/2002 |
| JP | 2003-004910 A | 1/2003 |

(Continued)

OTHER PUBLICATIONS

Final Office Action received in U.S. Appl. No. 14/623,070; dated Feb. 16, 2017.

(Continued)

*Primary Examiner* — Bao-Luan Le
(74) *Attorney, Agent, or Firm* — ALG Intellectual Property, LLC (57) ABSTRACT

A projector includes: an exterior housing configuring an exterior; a projection optical device which projects an image toward a projection surface; and a plurality of operation buttons which, being disposed in such a way as to be exposed to the outside of the exterior housing, an image opening for allowing the image projected from the projection optical device to pass through is formed in one sidewall, among sidewalls configuring the exterior housing, which intersects in a vertical direction, the projection optical device includes a reflecting mirror which reflects the image, and projects it through the image opening, and the plurality of operation buttons are disposed on a side of the one sidewall farther from the projection surface than the image opening.

23 Claims, 6 Drawing Sheets

(56) References Cited

U.S. PATENT DOCUMENTS

| | | | |
|---|---|---|---|
| 2008/0111976 A1* | 5/2008 | Takito et al. | 353/121 |
| 2008/0204673 A1* | 8/2008 | Hirata et al. | 353/99 |
| 2008/0218706 A1* | 9/2008 | Adachi et al. | 353/98 |
| 2009/0040473 A1* | 2/2009 | Amano et al. | 353/70 |
| 2009/0153809 A1* | 6/2009 | Amano et al. | 353/99 |
| 2011/0242506 A1 | 10/2011 | Uchiyama et al. | |

FOREIGN PATENT DOCUMENTS

| | | |
|---|---|---|
| JP | 2007-334052 A | 12/2007 |
| JP | 2008-250280 A | 10/2008 |
| JP | 2010-160476 A | 7/2010 |

OTHER PUBLICATIONS

Panasonic, Operating Instructions Model No. PT-L592U, User Manual, pp. 1-47.
Projector Central, Panasonic PT-L592U User Reviews, 2004-2006.
Sharp, User Manual for Model No. XG-E3500U, pp. 1-38.
Projector Central, Sharp XG-E5300U User Reviews, 2002-2008.

* cited by examiner

PROJECTOR HAVING REFLECTING MIRROR DISPOSED WITHIN HOUSING AND OPERATION BUTTONS DISPOSED ON SIDEWALL OF THE HOUSING

BACKGROUND

1. Technical Field

The present invention relates to a projector.

2. Related Art

To date, as a front projection type projector, a configuration has been known wherein a short focal projection optical device whose projection distance is shortened is employed in order to improve a degree of freedom in installing the projector (for example, refer to JP-A-2007-334052).

In the projector described in JP-A-2007-334052, the projection optical device includes at an optical path downstream extremity an aspherical mirror having a reflecting surface of a free-form surface shape which is not rotationally symmetric. Then, by an image being reflected by the aspherical mirror, the angle of the image is widened through an image opening provided in a top surface, among sidewalls configuring an exterior housing, which intersects in a vertical direction. With this kind of configuration, it is possible to install the projector in a position near a projection surface such as a screen, improving the degree of freedom in installing the projector.

However, as the projector, a configuration is in heavy usage wherein a plurality of operation buttons for prompting a user to operate and implement a starting, and the like, of the projector are exposed to the outside of the exterior housing.

Then, in the projector described in JP-A-2007-334052, when employing the plurality of operation buttons, the following first and second disposition positions are conceivable as the disposition positions of the plurality of operation buttons.

The first disposition position is a position on the top surface of the exterior housing on a side nearer to the projection surface than the image opening.

Also, the second disposition position is on a sidewall of the exterior housing adjacent to the top surface.

However, when the plurality of operation buttons are disposed in the first disposition position, there is a problem in that the projected image is blocked by the user's hand, or the like, when the plurality of operation buttons are operated, and a projection image displayed on the projection surface cannot be maintained in a good condition.

Meanwhile, when the plurality of operation buttons are disposed in the second disposition position, it is possible to avoid the projected image being blocked by the user's hand, or the like, even when the plurality of operation buttons are operated, and maintain the projection image in the good condition. However, there is a problem in that it is difficult to operate the plurality of operation buttons in comparison with when the plurality of operation buttons are disposed in the first disposition position.

SUMMARY

An advantage of some aspects of the invention is to provide a projector wherein it is possible to improve the operability of operation buttons, and it is possible to maintain a projection image in a good condition even when the operation buttons are operated.

A projector of one aspect of the invention includes an exterior housing configuring an exterior; a projection optical device which projects an image toward a projection surface; and a plurality of operation buttons which, being disposed in such a way as to be exposed to the outside of the exterior housing, cause various operating information to be input. An image opening for allowing the image projected from the projection optical device to pass through is formed in a first sidewall, among sidewalls configuring the exterior housing, which intersects in a vertical direction. The projection optical device includes a reflecting mirror which reflects the image, and projects it through the image opening. The plurality of operation buttons are disposed on a side of the first sidewall farther from the projection surface than the image opening.

According to the aspect of the invention, the plurality of operation buttons are disposed on the first sidewall, among the sidewalls configuring the exterior housing, which intersects in the vertical direction. Because of this, it is possible to improve the operability of the operation buttons in comparison with a configuration wherein the plurality of operation buttons are disposed on a second sidewall of the exterior housing adjacent to the first sidewall.

Also, the plurality of operation buttons are disposed on the side of the first sidewall farther from the projection surface than the image opening. Because of this, it not happening that the projected image is blocked by a user's hand, or the like, even when the plurality of operation buttons are operated by the user, it is possible to maintain a projection image in a good condition.

Consequently, it is possible to improve the operability of the operation buttons, and it is possible to maintain the projection image in the good condition even when the operation buttons are operated, so that it is possible to achieve the advantage of some aspects of the invention.

With the projector of the aspect of the invention, it is preferable that the first sidewall includes a first tilted surface extending toward the second sidewall of the exterior housing, which is opposed to the first sidewall, as it goes away from the projection surface, and that the plurality of operation buttons are disposed on the first tilted surface.

According to the aspect of the invention, the plurality of operation buttons are disposed on the first tilted surface formed on the first sidewall. Because of this, when the user operates the projector (plurality of operation buttons), for example, from the side far from the projection surface, as the first tilted surface causes the plurality of operation buttons to be disposed in such a way as to face the user, it is possible to easily operate the plurality of operation buttons.

With the projector of the aspect of the invention, it is preferable that the first sidewall includes a second tilted surface extending toward the second sidewall of the exterior housing, which is opposed to the first sidewall, as it comes nearer to the projection surface, that a concave portion depressed toward the reflecting mirror is formed in the second tilted surface, and that the image opening is formed in the bottom of the concave portion.

However, it is preferable that the image opening is formed in a position spaced a predetermined distance from the reflecting mirror in order not to unnecessarily increase the opening area.

Herein, when the concave portion is not formed in the second tilted surface of the first sidewall, a length dimension (a length dimension in a direction toward and away from the projection surface) of a surface (hereafter, a disposition surface) of the first sidewall on which the plurality of operation buttons are to be disposed is small as it is a length dimension from a region meeting the second tilted surface to an end of the projection optical device far from the projection surface. That is, it is difficult to dispose the plurality of operation buttons on the disposition surface.

According to the aspect of the invention, the concave portion is formed in the second tilted surface of the first sidewall, and the image opening is formed in the bottom of the concave portion. Because of this, it is possible to, while setting the formation position of the image opening to the position spaced the predetermined distance from the reflecting mirror, to set the second tilted surface to a position shifted, by an amount equivalent to the length of the sidewall of the concave portion, from the reflecting mirror to the optical path downstream side of the projected image. That is, by setting the second tilted surface to the heretofore described position, it is possible to increase the length dimension of the disposition surface (the length dimension from the region meeting the second tilted surface to the end of the projection optical device far from the projection surface) in comparison with the heretofore described configuration wherein the concave portion is not formed in the second tilted surface.

Consequently, it is possible to easily dispose the plurality of operation buttons on the disposition surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given, based on the drawings, of one embodiment of the invention.
Configuration of Projector FIG. 1 is a side view of a projector 1 in a used condition.

The projector 1 forms an image in accordance with image information, and projects the formed image onto a projection surface Sc (FIG. 1) such as a screen.

Figure 1:
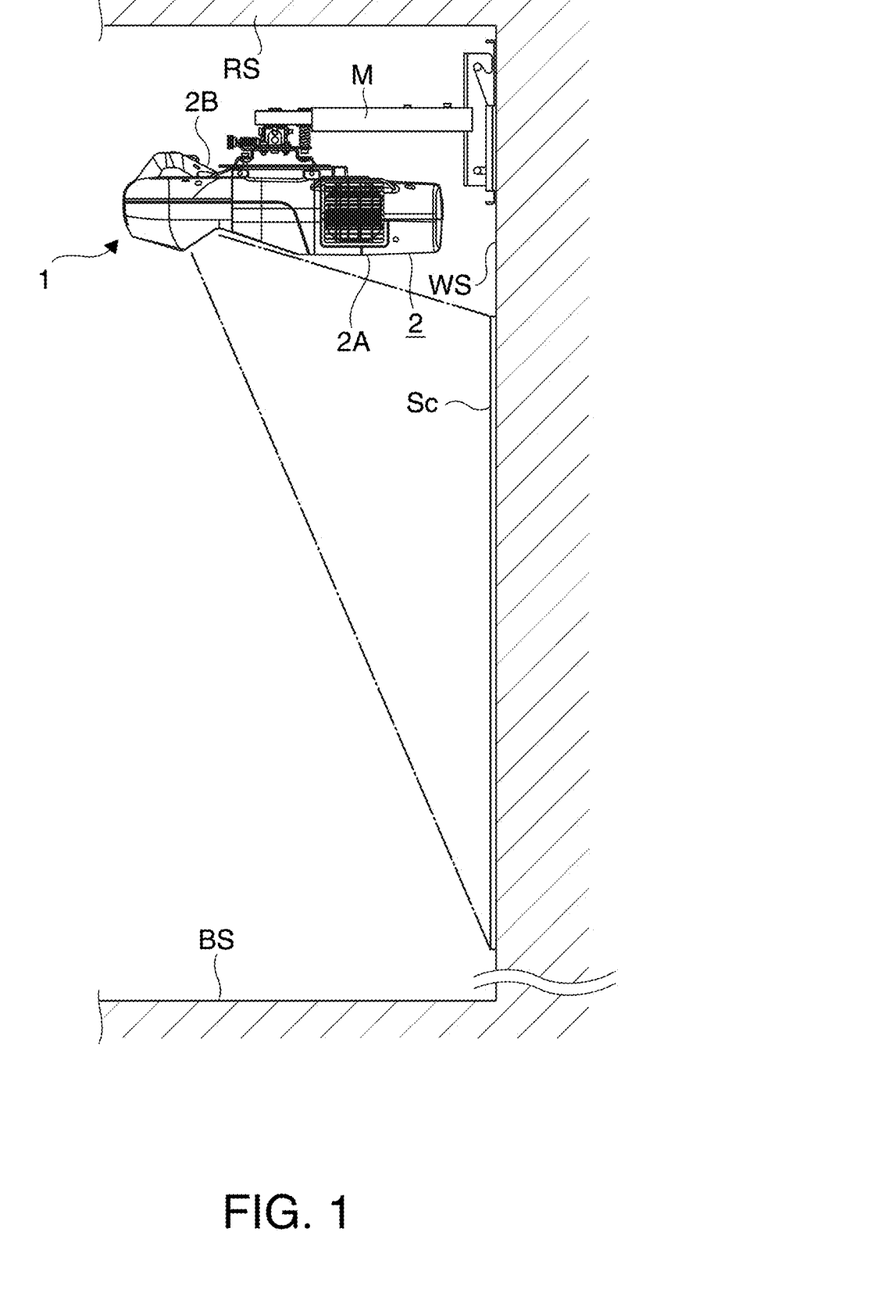
FIG. 1 is a side view of a projector in a used condition in an embodiment.

In the embodiment, as shown in FIG. 1, the projector 1 is disposed in a position near a ceiling surface RS, suspended with a ceiling mount M, in a room in which the projector 1 is installed. Then, the projector 1 projects the image toward the projection surface Sc installed on a wall surface WS.

The projector 1 includes an exterior housing 2 configuring its exterior, as shown in FIG. 1.

Hereafter, for convenience of description, of a pair of sidewalls 2A and 2B of the exterior housing 2 which intersect in a vertical direction, the sidewall 2A facing a floor surface BS in the used condition shown in FIG. 1 will be taken as a top surface, and the sidewall 2B facing the ceiling surface RS described as a bottom surface.

Figure 2:
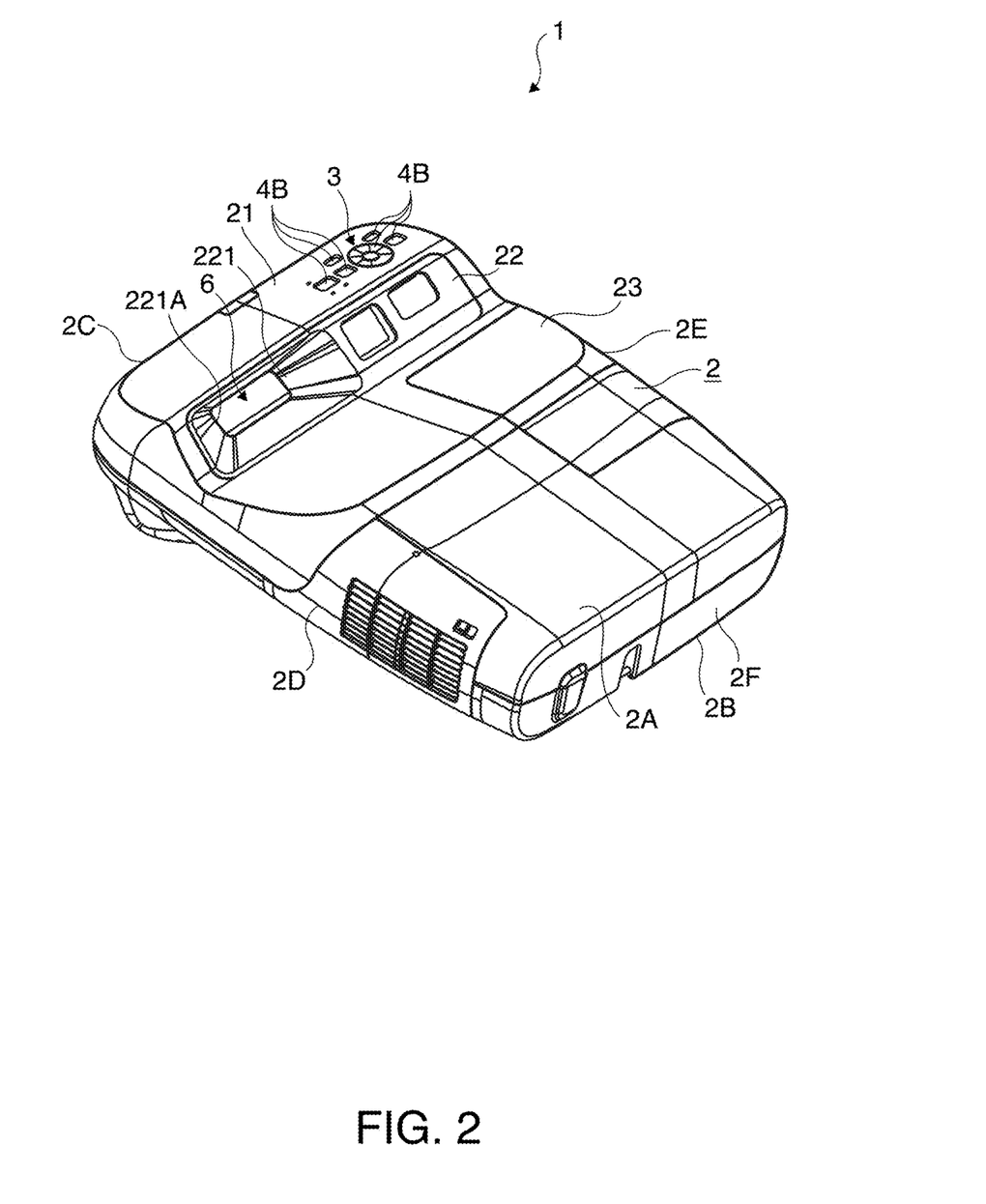
FIG. 2 is a perspective view of an external appearance of the projector in the embodiment.

Also, hereafter, a side of the projector 1 near the projection surface Sc in the used condition shown in FIG. 1 will be taken as a front, and a side thereof far from the projection surface Sc as a back.
External Configuration FIG. 2 is a perspective view showing an external appearance of the projector 1. Specifically, FIG. 2 is a perspective view of the projector 1 with the top surface 2A side seen from the front side.

Hereafter, a description will be given, for convenience of description, of each component of the projector 1 in a position in which the top surface 2A is faced upward, as shown in FIG. 2. That is, the "top" and "bottom" of FIG. 2 will be described as "up" and "down" respectively.

Figure 3:
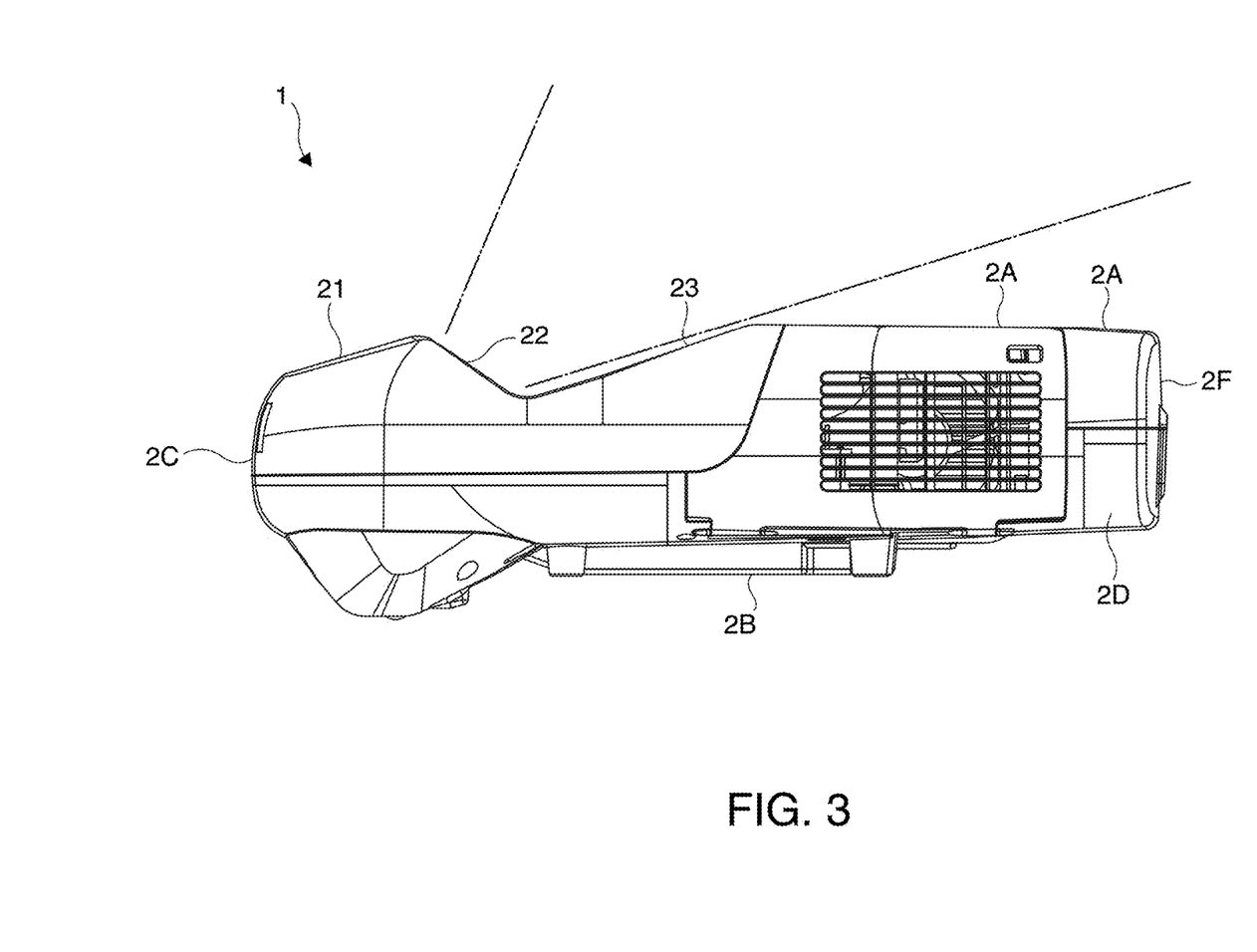
FIG. 3 is a drawing showing a configuration of a top surface of an exterior housing in the embodiment.

FIG. 3 is a drawing showing a structure of the top surface 2A of the exterior housing 2. Specifically, FIG. 3 is a side view of the projector 1 taken of the left side seen from the front side.

The exterior housing 2 houses the apparatus main body of the projector 1.

The top surface 2A of the exterior housing 2 is provided with a first tilted surface 21, a second tilted surface 22, and a third tilted surface 23 continuously from the back side to an approximately central position in a front-back direction (a direction from the front to the back), as shown in FIG. 2 or 3.

As shown in FIG. 3, the first tilted surface 21 is tilted downward (toward the bottom surface 2B of the exterior housing 2) in the direction of the back (as it goes away from the projection surface Sc).

As shown in FIG. 2, an operation panel 3 which prompts a user to implement a starting, an adjusting operation, and the like, of the projector 1 is disposed on the first tilted surface 21.

The operation panel 3 includes a circuit substrate 4A (refer to FIG. 6) mounted on the rear surface of the first tilted surface 21, and a plurality of operation buttons 4B (refer to FIGS. 2 and 6) provided exposed to the outside of the exterior housing 2 from the first tilted surface 21, of which a specific description will be given hereafter.

As shown in FIG. 2 or 3, the second tilted surface 22 is tilted downward from the back toward the front.

As shown in FIG. 2, a concave portion 221 depressed in a direction obliquely below the back up to a position near a second image opening 631, to be described hereafter, of a projection optical device 6 is formed in the second tilted surface 22 so as to correspond to the disposition position of the projection optical device 6 (refer to FIGS. 5 and 6).

Also, an image opening 221A for allowing an image projected by the projection optical device 6 to pass through is formed in the bottom portion of the concave portion 221.

That is, the operation panel 3 is disposed on a more backward side (a side farther from the projection surface Sc) than the image opening 221A.

As shown in FIG. 2 or 3, the third tilted surface 23 is tilted upward from the back toward the front.
Internal Configuration FIG. 4 is a perspective view of an optical unit 5 housed inside the exterior housing 2 seen from behind and above.

Figure 4:
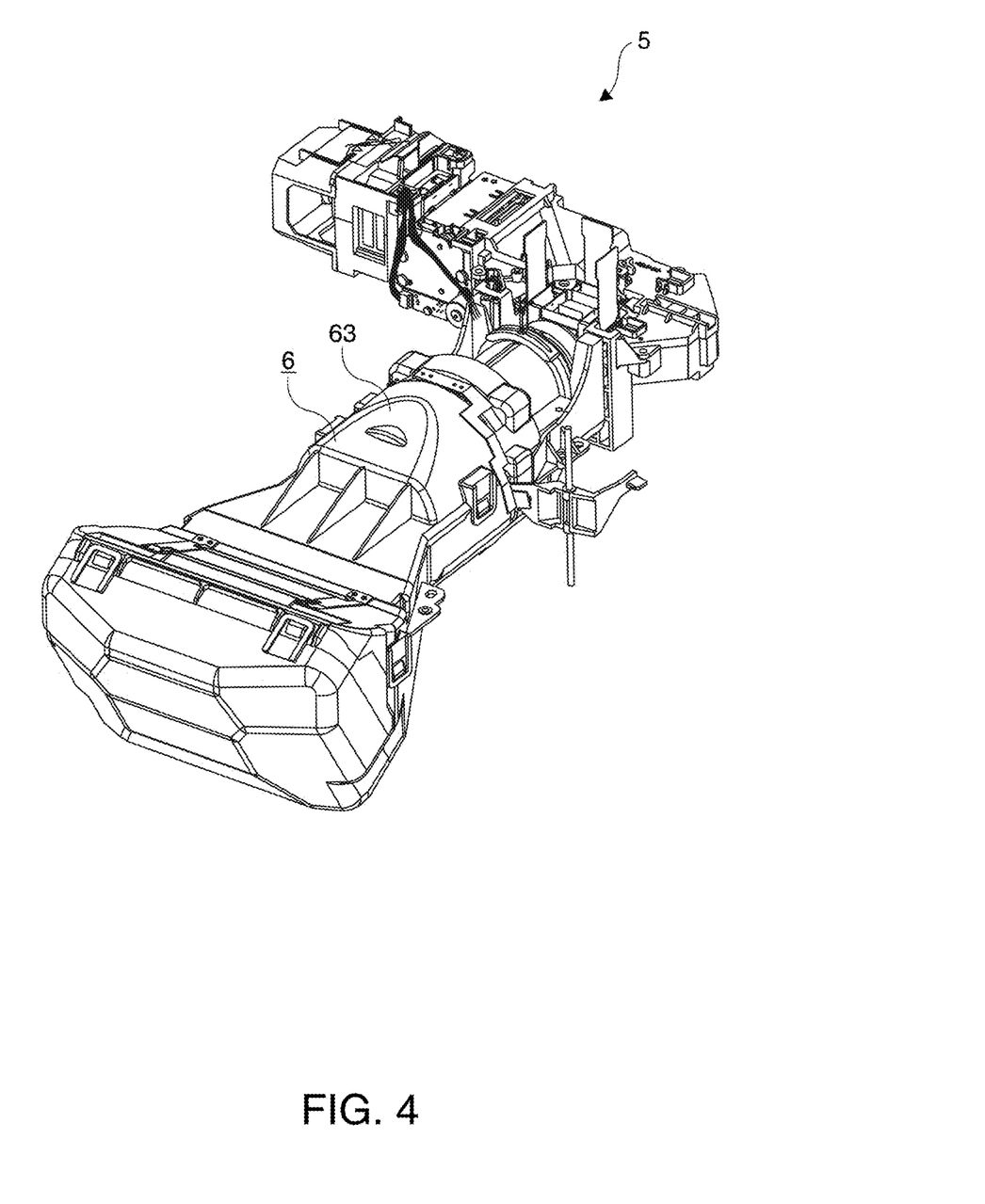
FIG. 4 is a perspective view of an optical unit housed inside the exterior housing in the embodiment, seen from a back and upper side.

The optical unit 5 shown in FIG. 4 is housed inside the exterior housing 2.

Although a specific illustration is omitted, it is taken that a cooling unit, which includes a cooling fan cooling the inside of the exterior housing 2, and the like, a power source unit, which supplies power to each component member of the projector 1, and a control device, which controls an operation of each component member of the projector 1, are disposed in a space other than the optical unit 5 inside the exterior housing 2.

The optical unit 5 includes a light source device, an optical modulation device, such as a liquid crystal panel, which modulates a luminous flux emitted from the light source device in accordance with the image information, and forms an image, the projection optical device 6 (FIG. 4), which projects the image formed by the optical modulation device toward the projection surface Sc, and the like.

With respect to the optical unit 5, as it is utilized in various common projectors, a specific illustration and description are omitted, and only a configuration of the projection optical device 6 will be described hereafter.

Figure 5:
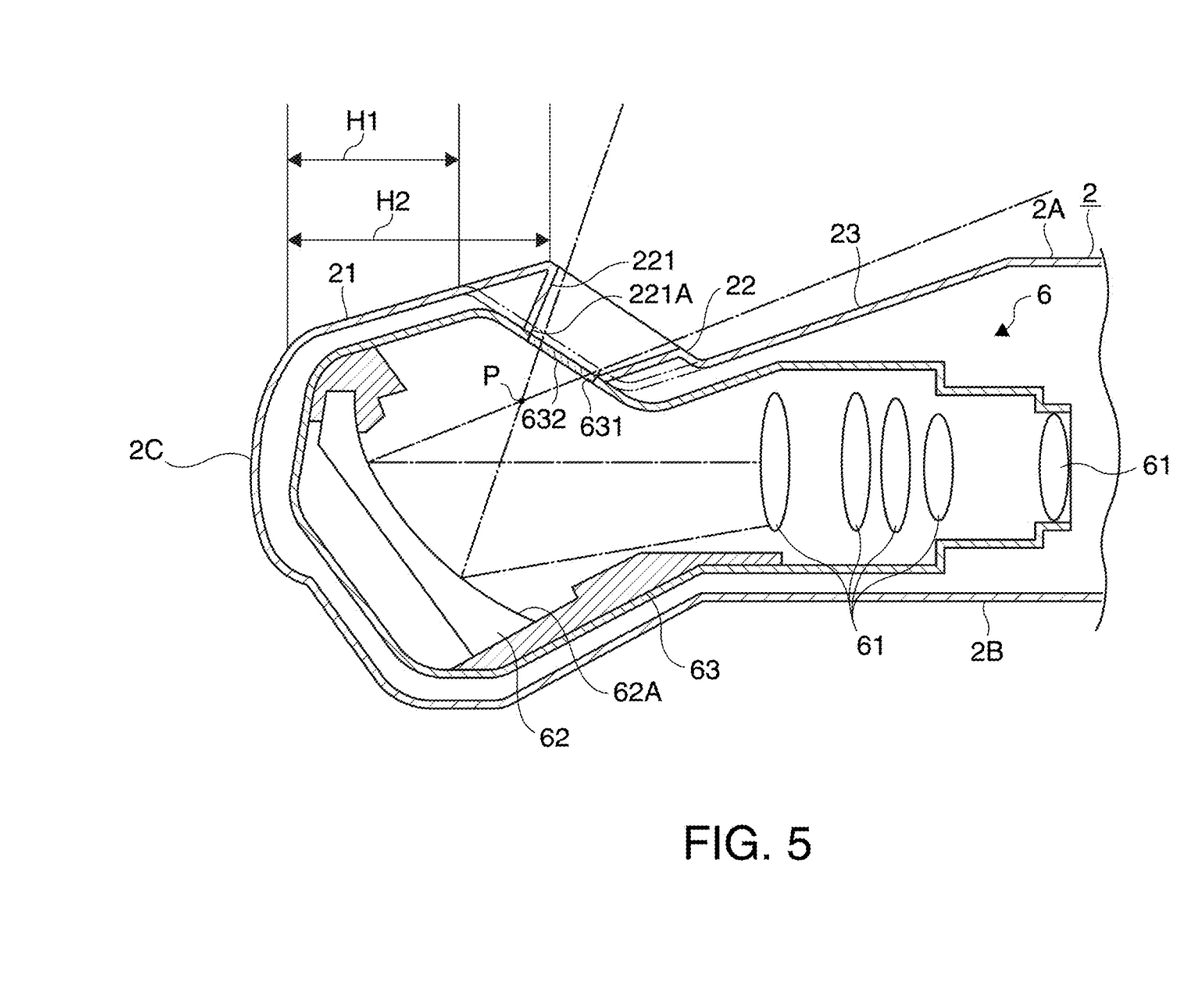
FIG. 5 is a sectional view schematically showing an internal configuration of a projection optical device in the embodiment.

FIG. 5 is a sectional view schematically showing an internal configuration of the projection optical device 6.

As shown in FIG. 4 or 5, the projection optical device 6 includes a plurality of lenses 61 (FIG. 5), an aspherical mirror 62 (FIG. 5) as a reflecting mirror, and a holding body 63.

The aspherical mirror 62 has a reflecting surface 62A of a free-form surface shape which is not rotationally symmetric. Then, the aspherical mirror 62, being disposed at the optical path downstream extremity of the projection optical device 6 in such a way that the reflecting surface 62A faces in a frontward and obliquely upward direction, reflects the image led from the front to the back by the plurality of lenses 61 in the frontward and obliquely upward direction, and widens the angle thereof.

The holding body 63, being formed in a hollow shape, houses the plurality of lenses 61 and aspherical mirror 62.

As shown in FIG. 5, the second image opening 631 for allowing the image reflected by the aspherical mirror 62 to pass through is formed on the upper side of the holding body 63.

Then, a light transmission plate 632, such as glass, is attached to the holding body 63 so as to close the second image opening 631.

By adopting the projection optical device 6, it is possible to dispose the projector 1 in a position near the projection surface Sc, improving a degree of freedom in installing the projector 1. That is, as the projector 1 can be disposed in a position nearer to the wall surface WS on which the projection surface Sc such as a screen is provided, it is possible to reliably avoid a situation in which light traveling in the direction of an observer from the screen is blocked by the projector 1, and it is possible to carry out a comfortable appreciation of a video.

Configuration of Operation Panel

Figure 6:
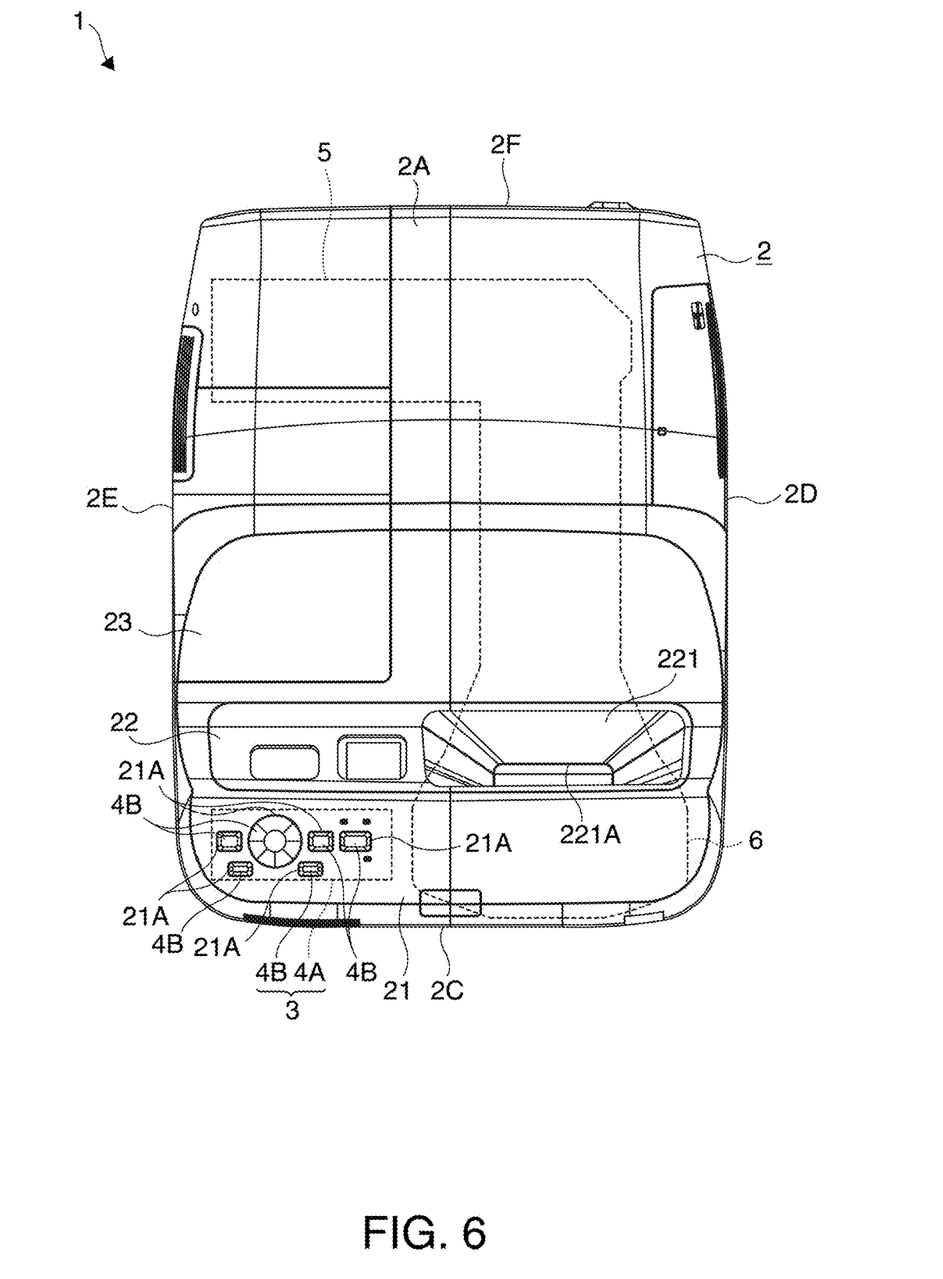
FIG. 6 is a drawing showing a configuration of an operation panel in the embodiment.

FIG. 6 is a drawing showing a configuration of the operation panel 3. Specifically, FIG. 6 is a top view of the projector 1.

As shown in FIG. 6, the operation panel 3 is disposed in a position (a left end side position seen from the back side) on the first tilted surface 21 away from the disposition position of the projection optical device 6 when viewed in plan.

A plurality of tact switches, although a specific illustration is omitted, are mounted on the circuit substrate 4A configuring the operation panel 3.

For example, the plurality of tact switches are configured of a power switch which implements a powering on and off of the projector 1, an input change-over switch for changing over the input of an image, a menu switch for displaying a menu screen, and the like.

The plurality of operation buttons 4B configuring the operation panel 3, being provided corresponding to the plurality of tact switches, are disposed in such a way as to be exposed to the outside through a plurality of operation openings 21A (FIG. 6) formed in the first tilted surface 21.

The operation buttons 4B, being buttons depressed by the user, by being depressed, depress the corresponding plurality of tact switches. That is, the user inputs various operating information (information on the powering on and off, image input change-over, menu screen display, and the like) by depressing the plurality of operation buttons 4B. Then, by the plurality of tact switches being depressed, a signal in response to the concave portion of each kind of tact switch is output from the circuit substrate 4A to the control device, and a control (the powering on and off, image input change-over, menu screen display, or the like) in response to the concave portion of each kind of tact switch is implemented by the control device.

According to the heretofore described embodiment, there are the following advantages.

In the embodiment, the operation panel 3 is disposed on the top surface 2A. Because of this, it is possible to improve the operability of the plurality of operation buttons 4B in comparison with a configuration wherein the operation panel 3 is disposed on one of sidewalls 2C to 2F (FIGS. 2 and 6) adjacent to the top surface 2A.

Also, the operation panel 3 is disposed on a more backward side of the top surface 2A than the image opening 221A. Because of this, it not happening that the projected image is blocked by the user's hand, or the like, even when the plurality of operation buttons 4B are operated by the user, it is possible to maintain a projection image in a good condition.

Furthermore, the operation panel 3 is disposed on the first tilted surface 21 formed on the top surface 2A. Because of this, when the user operates the projector 1 (the plurality of operation buttons 4B), for example, from the side far from the projection surface Sc, as the first tilted surface 21 causes the plurality of operation buttons 4B to be disposed in such a way as to face the user, it is possible to easily operate the plurality of operation buttons 4B.

However, the image opening 221A is formed in a position spaced a predetermined distance from the aspherical mirror 62 (a position near a position P (FIG. 5) on which the light (image) reflected by the aspherical mirror 62 has converged) in order not to unnecessarily increase the opening area.

Herein, when the concave portion 221 is not formed in the second tilted surface 22 of the top surface 2A, a length dimension H1 (a length dimension in the front-back direction) of the first tilted surface 21 on which the operation panel 3 is to be disposed is small as it is a length dimension from a region meeting the second tilted surface 22 to the back side end of the projection optical device 6, as shown by the two-dot chain line of FIG. 5. That is, it is difficult to dispose the operation panel 3 on the first tilted surface 21.

In the embodiment, the concave portion 221 is formed in the second tilted surface 22 of the top surface 2A, and the image opening 221A is formed in the bottom portion of the concave portion 221. Because of this, it is possible to, while setting the formation position of the image opening 221A to the position near the position P, set the second tilted surface 22 to a position shifted, by an amount equivalent to the length of the sidewall of the concave portion 221, to the optical path downstream side of the image projected from the aspherical mirror 62, as shown by the solid line of FIG. 5. That is, by setting the second tilted surface 22 to the heretofore described position, it is possible to increase a length dimension H2 (FIG. 5) of the first tilted surface 21 in comparison with the length dimension H1 when the concave portion 221 is not formed in the second tilted surface 22.

Consequently, it is possible to easily dispose the operation panel 3 on the first tilted surface 21.

Also, the operation panel 3 is disposed in the position away from the disposition position of the projection optical device 6 when viewed in plan. Because of this, it is possible to dispose the operation panel 3 on the first tilted surface 21 without any mechanical interference with the projection optical device 6, and it is possible to easily wire the circuit substrate 4A and previously described control device.

The invention not being limited to the previously described embodiment, a modification, improvement, and the like, within the scope in which it is possible to achieve the advantage of some aspects of the invention are included in the invention.

In the embodiment, the second tilted surface 22 is formed on the top surface 2A but, not being limited to this, it is also acceptable that the second tilted surface 22 is formed in such a way as to follow the horizontal plane, rather than it being formed as a tilted surface.

Also, the concave portion 221 is formed in the second tilted surface 22, and the image opening 221A is formed in the bottom portion of the concave portion 221 but, not being limited to this, it is also acceptable to adopt a configuration wherein the concave portion 221 is omitted, and the image opening 221A is directly formed in the second tilted surface 22.

In the embodiment, the operation panel 3 is disposed on the left end side seen from the back side, but it is also acceptable that it is disposed in any position, provided that the position is on the first tilted surface 21.

The projector of some aspects of the invention can be utilized as a projector used for a presentation and a home theater.

The present application claim priority from Japanese Patent Application No. 2009-145053 filed on Jun. 18, 2009, which is hereby incorporated by reference in its entirety.

What is claimed is:

1. A short-throw projector comprising:
a light source device,
an optical modulation device that modulates a luminous flux emitted from the light source device in accordance with an image data to form an image,
a projection optical device that projects the image from the optical modulation device toward a projection surface,
an operation button which is disposed in such a way as to be exposed to the outside of a projector exterior housing,
an image opening for allowing the image projected from the projection optical device to pass through,
wherein the projection optical device includes a reflecting mirror which reflects the image, and projects it through the image opening,
wherein the optical modulation device, the image opening, the operation button, and a sidewall of the projector exterior housing are respectively arranged in order from nearest to farthest from the projection surface.

2. The short-throw projector according to claim 1,
wherein the position of the operation button is on an upper side relative to the position of the image opening in a case in which light from the short-throw projector is projected from the lower side of a direction that is perpendicular to the upper side.

3. The short-throw projector according to claim 1,
wherein at least a portion of the projector exterior housing is disposed on an upper side relative to the operation button.

4. The short-throw projector according to claim 1,
wherein the reflecting mirror is an aspheric mirror that reflects the image toward the projection surface, the operation button being disposed on a surface that overlaps the aspheric mirror in plan view.

5. A short-throw projector comprising:
a light source device,
an optical modulation device that modulates a luminous flux emitted from the light source device in accordance with an image data to form an image,
a projection optical device that projects the image from the optical modulation device toward a projection surface in a projection direction,
an operation button which is disposed in such a way as to be exposed to the outside of a projector exterior housing, the operation button being disposed away from a position of the projection optical device in a direction that intersects the projection direction when viewed in plan,
an image opening for allowing the image projected from the projection optical device to pass through,
wherein the projection optical device includes a reflecting mirror which reflects the image, and projects it as light through the image opening,
wherein the position of the operation button is shifted from the light passing out from the image opening,
wherein the operation button is disposed farther from the projection surface than the image opening.

6. The short-throw projector according to claim 5,
wherein the operation button is a powering on and off switch.

7. The short-throw projector according to claim 5,
wherein the operation button is an image input changeover switch.

8. The short-throw projector according to claim 5,
wherein the operation button is a menu screen display switch.

9. The short-throw projector according to claim 5,
wherein the position of the operation button is on an upper side relative to the position of the image opening in a case in which light from the short-throw projector is projected from the lower side of a direction that is perpendicular to the upper side.

10. The short-throw projector according to claim 5,
wherein at least a portion of the projector exterior housing is disposed on an upper side relative to the operation button.

11. The short-throw projector according to claim 5,
wherein the reflecting mirror is an aspheric mirror that reflects the image toward the projection surface, the tilted surface overlapping the aspheric mirror in plan view.

12. A short-throw projector comprising:
a light source device,
an optical modulation device that modulates a luminous flux emitted from the light source device in accordance with an image data to form an image,
a projection optical device that projects the image from the optical modulation device toward a projection surface,
an operation button which is disposed in such a way as to be exposed to the outside of a projector exterior housing, an image opening for allowing the image projected from the projection optical device to pass through, wherein the projection optical device includes a reflecting mirror which reflects the image and projects it through the image opening, wherein the optical modulation device, the image opening, the operation button, and a a sidewall of the projector exterior housing are respectively arranged in order from nearest to farthest from the projection surface, wherein the position of the operation button is on an upper side relative to the position of the image opening in a case in which light from the short-throw projector is projected from the lower side of a direction that is perpendicular to the upper side.

13. The short-throw projector according to claim 12, wherein the operation button is a powering on and off switch.

14. The short-throw projector according to claim 12, wherein the operation button is an image input changeover switch.

15. The short-throw projector according to claim 12, wherein the operation button is a menu screen display switch.

16. The short-throw projector according to claim 12, wherein the reflecting mirror projects the image as light through the image opening, wherein the position of the operation button is shifted from the light passing out from the image opening.

17. The short-throw projector according to claim 12, wherein the reflecting mirror is an aspheric mirror that reflects the image toward the projection surface, the operation button being disposed on a surface that overlaps the aspheric mirror in plan view.

18. A short-throw projector comprising:
a light source device,
an optical unit that includes an optical modulation device that modulates a luminous flux emitted from the light source device in accordance with an image data to form an image,
a projection optical device that projects the image from the optical modulation device toward a projection surface,
an operation panel which prompts a user to implement an operation of the projector,
an image opening for allowing the image projected from the projection optical device to pass through, wherein the projection optical device includes a reflecting mirror which reflects the image, and projects it through the image opening, wherein the optical unit is L-shaped such that an end portion of the optical unit is disposed away from a main portion of the optical unit in a first direction when viewed in plan, wherein at least one operation button of the operation panel is disposed away from the projection optical device in the first direction when viewed in plan.

19. The short-throw projector according to claim 18,
wherein the operation panel includes at least one operation button,
wherein the optical modulation device, the image opening, and the at least one operation button are respectively arranged in order from nearest to farthest from the projection surface.

20. The short-throw projector according to claim 18,
wherein the reflecting mirror projects the image as light through the image opening,
wherein the operation panel includes at least one operation button,
wherein the position of the at least one operation button is shifted from the light passing out from the image opening.

21. The short-throw projector according to claim 18,
wherein the operation panel includes at least one operation button,
wherein the at least one operation button is disposed farther from the projection surface than the image opening.

22. The short-throw projector according to claim 18,
wherein the operation panel includes at least one operation button,
wherein the position of the at least one operation button is on an upper side relative to the position of the image opening in a case in which light from the short-throw projector is projected from the lower side of a direction that is perpendicular to the upper side.

23. The short-throw projector according to claim 18,
wherein the reflecting mirror is an aspheric mirror that reflects the image toward the projection surface, the tilted surface overlapping the aspheric mirror in plan view.

* * * * *